June 10, 1969   J. D. RUSSELL   3,448,607
STRAIN GAUGE TEMPERATURE COMPENSATION SYSTEM
Filed Oct. 18, 1965

INVENTOR:
John D. Russell

Attorneys

INVENTOR:
John D. Russell

United States Patent Office 3,448,607
Patented June 10, 1969

3,448,607
STRAIN GAUGE TEMPERATURE COMPENSATION SYSTEM
John D. Russell, Malibu, Calif., assignor to Microdot, Inc., South Pasadena, Calif., a corporation of California
Filed Oct. 18, 1965, Ser. No. 497,098
Int. Cl. G01n 25/00; G01l 1/22
U.S. Cl. 73—88.5
10 Claims

ABSTRACT OF THE DISCLOSURE

This invention relates to a system for measuring strains in a member and providing an indication of such strains. The system includes at least one strain gauge connected in a bridge with other resistance members, preferably strain gauges, to compensate for temperature changes. The bridge is provided with characteristics to maintain a constant current from a source of constant voltage even when the member is subjected to a variable strain. The output voltage from the bridge provides an indication of such variations in strain.

Preferably the resistors in the bridge constitute strain gauges which are connected to the member so that some of the strain gauges become stressed and others become strained when the member is stressed or strained. In one embodiment, one of the strain gauges becomes strained with changes in temperature but is not affected by stresses or strains in the member being measured. Additional resistors may also be included in the bridge to provide additional compensations for temperature changes.

---

This invention relates in general to strain gauge systems, including both the strain-transducing element itself and the electrical system for exciting and deriving a measurement from the strain gauge. More particularly, the invention relates to the methods and equipment for temperature compensation and measurement in strain gauge systems intended to be usable in the temperature range from −320° F. to 1200° F. and provides both means and methods for simultaneous and continuous monitoring of both strain and temperature using the identical set of sensors to accomplish the measurement of these two variables under static and/or dynamic conditions. The invention can be adapted to measure other sets of physical quantities simultaneously and continuously with the identical sensors, such as, for example, both bending strains and tension strains and also provides a simple method for improved temperature compensation for strain gauges subjected to steep thermal gradients and rapidly varying temperatures in ranges from −320° F. or lower to above 1200° F.

There are many techniques for the measurement of strain in solid materials and many uses of strain measurement. The term "strain" refers to the linear deformation or change in length of any particular linear dimension of a solid body. Strains caused by the application of a physical quantity such as force or pressure to a body are usually of more concern than strains caused by free expansion during temperature changes. By far the most important technique for measuring strain is the use of a bonded resistance strain gauge. A bonded resistance strain gauge is composed of a very small filament of thin wire or thin metallic foil mounted on an insulating material such as paper or plastic. The filament material is conductive and preferably has the property of linear variation of electrical resistance with strain, at least over a usable segment of its resistance/strain curve. The term "bonded" refers to the practice of cementing the insulated portion of the gauge directly to the surface of the part to be measured so that the strain gauge will faithfully follow and reflect any strains occurring in the surface in the direction of the gauge filament.

The bonded resistance gauge consists essentially of a fine wire (typical diameters are .002″ to .0005″) or etched foil grid with larger lead wires affixed to the ends of said grid by soldering or welding. This grid of high resistivity material is bonded to a thin sheet of insulating material such as plastic or paper. When used, the gauge is cement-bonded to the surface of a structure where strain measurement is desired. When the bonding cement cures, the wire grid is securely bonded to and insulated from said structure.

U.S. Patent No. 3,141,232, issued to the inventor in the instant case, describes a somewhat different version of the resistance wire strain gauge wherein the fine strain sensing element is surrounded by a powdered insulation such as aluminum or magnesium oxide, in turn surrounded and compressed by a flanged and swaged metal shell which can be attached to a test structure by spot welding.

There are many variations in the size, material, resistance and sensitivity of these widely used gauges, which are frequently combined with mechanical structures such as rings, links, tubes and beams to measure a variety of physical quantities such as pressure, force, deflection and acceleration. In fact, any physical quantity which can be made to produce a strain is measurable through the use of strain gauges.

Strain is a change in a dimension of an object and is expressed by the following formula:

$$\epsilon = \frac{\Delta L}{L}$$

where $\epsilon$ = Strain
$\Delta L$ = Change in length (dimension)
$L$ = Original length (dimension)

When a resistance element strain gauge is affixed to a structure by bonding or welding, it experiences essentially the same strains as the underlying structure (ignoring slight differences that could occur because of shear lag, creep and other such problems), and strains parallel to the longitudinal axis of the wire introduce resistance changes according to the following formula:

$$\frac{\Delta R}{R} = G\epsilon$$

where $\Delta R$ = Changes in resistance
$R$ = Original resistance
$G$ = Gauge factor or sensitivity factor
$\epsilon$ = Strain The gauge or sensitivity factor $G$ is usually established by subjecting sample gauges to known strains and recording the corresponding resistance changes. The gauge factor for the most widely used gauges is approximately 2.0. Assuming a gauge factor of 2.0, a strain of $1,000 \times 10^{-6}$ in./in. (a stress of approximately 30,000 p.s.i. in steel) would result in a strain of this same amount in the gauge. For a gauge resistance of 120 ohms, the result would be:

(1) $\Delta R/R = 2 \times 1,000 \times 10^{-6} = 2 \times 10^{-3} = .002 \Delta r/r$ (2) $$120 \frac{\Delta R}{R} = 120 \times .002 = .240$$

or approximately ¼ ohm change in resistance. Such a gauge can be used to detect strains of $1\mu$ in./in. (microinch per inch) which is, in the above case, $$2 \times 10^{-6} \frac{\text{ohms}}{\text{ohm resistance}}$$

or, for the 120 ohm gauge, $240 \times 10^{-6}$ or .000240 ohm.

A resistance strain gauge is mechanically affixed to the surface of the body, the strain of which is to be measured and is electrically connected into some circuit arrangement which is extremely sensitive to small changes of resistance. Due to the small cost of the above-described gauges and their measuring instruments, bonded resistance strain gauges are very widely used. Literally thousands of them are cemented to the various structural members of every airplane and missile put under test. They are also used for testing experimental or developmental boat hulls, automobiles, railroad locomotives and rails, fixed structures such as bridges, buildings and highways, and all types of machinery such as presses, machine tools and cranes. In addition to direct use for strain measurement, such strain gauges are also useful for measuring applied force as a function of strain and thus can also measure torque, acceleration, weight and even fluid pressure.

As stated above, the change in resistance of a bonded resistance strain gauge is often no more than $2.4 \times 10^{-4}$ ohm. To accurately measure such small resistances, the gauge is usually connected as an arm of a Wheatstone bridge, and the bridge output is given by the following formula:

$$e/v = G\frac{\epsilon}{4}$$

where $e$ = output voltage
$v$ = input voltage
$G$ = gauge factor
$\epsilon$ = strain In the above case, and assuming 10 volts on the bridge $$e/10 = 2.0 \times \frac{1000}{4} \times 10^{-6}$$
$$e = 20 \times 250 \times 10^{-6}$$
$$e = 5000 \times 10^{-6}$$
$$e = 5 \times 10^{-3}$$

Thus, a strain of $1000\mu$ in./in. provides a 5 mv. output in this example.

It is possible in some cases to make all four arms of the bridge active gauges, in which case the output formula becomes, if all four gauges have the same properties:

$$e'v = G\left(\frac{E_1}{4} - \frac{E_2}{4} + \frac{E_3}{4} - \frac{E_4}{4}\right)$$

It should be noted that four gauges could not be used in the bridge when the strains involved are of the same sign and of equal magnitude because the right hand side of the formula would then be zero for any strain magnitude. Only when strains of opposite sign are available, such as in the case of a bending beam with gauges one and three on one side and two and four on the other side, is the four-arm bridge of optimum use.

As useful as the bonded resistance strain gauge is, it would be absolutely worthless if it were not used in a system which provided for or minimized inaccuracies due to change in temperature. This is due not only to the fact that the resistance of most of the conductive materials used in bonded resistance strain gauge filaments changes with temperature, but also because the thermal coefficient of expansion of the strain gauge filament will often be different from that of the structure to which it is bonded and sensitivity to or measurement of strains resulting from thermal expansion is not desired. Thus, even if the filament of the strain gauge were not directly temperature sensitive because of its change in resistance with change in temperature, it would still be subject to false strain indications with temperature unless it has a coefficient of expansion matched with the coefficient of expansion of the surface to which it is bonded. Such matching would be extremely difficult and probably rather expensive because a strain gauge matched to steel would be greatly in error if bonded to aluminum or some other material, and vice versa.

Since temperature changes also result in resistance changes in a gauge filament, it is imperative that some means be employed to cancel the effects of these temperature changes from the strain measurements. The resistance changes which accompany temperature changes are caused not only by the thermal coefficient of resistivity of the wire filament, but also by the differences in the linear coefficients of expansion of the wire and test structure. Thus, the temperature sensitivity of a particular gauge will vary according to the material to which it is to be affixed, and any compensating system must be usable with a variety of test materials. Such temperature sensitivity is often expressed as "apparent strain" rather than as a change in resistance, since the ultimate error calculation must relate to the actual strain measurements.

The most widely used temperature compensation method for bonded resistance strain gauges makes use of the electrical system to which they are electrically connected and also of the mechanical system to which they are cemented or welded. The Wheatstone bridge, as is well known, is composed of four resistors $R_1$, $R_2$, $R_3$ and $R_4$, arranged in an electrical bridge configuration, which is to say: $R_1$ and $R_2$ are coupled between a first input terminal and first and second output terminals, respectively, while $R_3$ and $R_4$ are connected between a second input terminal and the second and first output terminals, respectively (following the usual notation). A voltage E applied across the input terminals causes the current flow $I_1$ through the resistors $R_1$ and $R_4$ and the current flow $I_2$ through the resistors $R_2$ and $R_3$. Across the output terminals there then appears a voltage $e$ which equals both $(R_1I_1 - R_2I_2)$ and also $(R_3I_2 - R_4I_1)$ and which can be measured by a standard voltmeter or galvonometer setup. If $R_1$ is the bonded resistance strain gauge discussed above and $R_2$, $R_3$ and $R_4$ are fixed, $e$ will vary solely in response to variations in $R_1$. When the output voltage is zero (i.e., $e = 0$, known as the "balanced bridge" condition), $R_1I_1 = R_2I_2$ and $R_3I_2 = R_4I_1$, so that the relation $$\frac{R_1}{R_4} = \frac{R_2}{R_3}$$

can be derived.

In this above-described Wheatstone bridge setup, then, temperature compensation is accomplished by installing a second strain gauge, also known as an inactive or "dummy" gauge, on an unstrained piece of the same type of material as that to which the active strain gauge is bonded. If the two pieces of material are subjected to the same temperatures during testing, both gauges will experience identical thermal resistance changes. This is true whether resistance changes occur due to the change in temperature coefficient of resistance of the conductor in the gauges or due to the differential expansion existing between the gauges and the metal to which they are bonded. As a practical matter, the dummy gauge is often connected on the same surface as the active strain gauge, but with its filament perpendicular to the filament of the active gauge so that the strains in the surface (in cases where stress-induced strains occur only in the same line as the filament of the active gauge) will not affect the filament of the dummy gauge.

The dummy gauge would appear in the position $R_2$ of the Wheatstone bridge described above and will be identical to the active gauge used in the position $R_1$, so that both have the same resistance. Thus, both gauges would experience the came change in resistance due to an increase in temperature ($\Delta R$). Of course, if the Wheatsone bridge is balanced, the relation $$\frac{R_1 + \Delta R}{R_4}$$

will equal $$\frac{R_2 + \Delta R}{R_3}$$

It should be noted that a dummy strain gauge will give equally effective temperature compensation if it is connected in the $R_4$ position of the Wheatstone bridge, for then the equation $$\frac{R_1}{R_4} = \frac{R_2}{R_3}$$

will hold true regardless of changes due to temperature in $R_1$ and $R_4$, as both the numerator and the denominator of the left-hand side of the equation will increase in the same proportion. The one position where the dummy gauge should not be connected, of course, is the $R_3$ position, where temperature distortion would be cumulative in its effect upon the bridge rather than compensatory. In some uses of strain gauges it has been found that the temperature compensating gauge can actually be used as a second active gauge rather than being relagated to the inactive or dummy rule; and there now have been developed self-temperature compensating strain gauges wherein filaments are composed of two different metals which complement each other, cancel each other or in some other way perform compensation right within the gauge. Such devices are, however, extremely limited in their accuracy (20% error is not uncommon) and thus require further compensation, accomplished by making separate measurements of the temperature involved and computing correction factors for each item of data. This process is not only painstaking and almost prohibitive of the use of large numbers of strain gauges but is also still subject to great inaccuracy because it is impossible to be certain of the temperature measurement even if a very closely placed thermocouple is used. If the same strain gauges are used to monitor both temperature and strain, the accuracy would seem to be assured; yet in such a case it has been necessary heretofore to switch between the measuring circuits for strain and the measuring circuits for temperature so that the two could never be monitored continuously or simultaneously. Especially in the case of measurements of dynamic strain (i.e., the cyclic strain of low or high frequency found in jet, steam-turbine and reciprocating engines), such a procedure is greatly lacking in adequacy.

To understand the earliest and still widely used compensation method for moderate and slow temperature changes, consider again the bridge output formulae where $$e/v = \frac{G}{4}[E_1 - E_2 + E_3 - E_4]$$

$$e/v = \frac{1}{4}\left(\frac{\Delta R_1}{R_1} - \frac{\Delta R_2}{R_2} + \frac{\Delta R_3}{R_3} - \frac{\Delta R_4}{R_4}\right)$$

and note that as long as $E_1$, $E_2$, $E_3$ and $E_4$ are of equal magnitude and of the same sign, $e/v$ is zero. Thus, if the thermally induced changes or apparent strains are equal and of the same sign, then they will not give any bridge unbalance regardless of their individual magnitude.

In the case of moderate, slowly varying changes, this is readily accomplished by attaching four identical gauges to identical pieces of material in such position that any changes in temperature affect them equally.

In cases of unidirectional strain where the four gauges cannot be used on a structure, then two of the gauges ($E_2$ and $E_4$), for example, would be attached to small separate pieces of material indentical to that of the test structure so that they would respond to temperaure exactly as $E_1$ and $E_3$, leaving $e/v$ essentially zero regardless of temperature changes. These two gauges $E_2$ and $E_4$ are both commonly referred to as the "dummy" gauges, and the system of compensation as the "dummy gauge system."

It should be noted that in this case only gauges 1 and 3 would be subjected to strains in the structure and would be phased in the same direction. Thus, the output reading would be proportional to strains in 1 and 3 and essentially unaffected by the temperature changes which would be affecting all four gauges alike. The dummy gauge system need not employ a four-guage bridge. A bridge with one active and one dummy gauge and two matched resistors is commonly used. The dummy gauge technique is not practical where the temperatures are varying rapidly and where steep thermal gradients are involved, for the simple reason that under such conditions there can be no assurance that the temperature changes will be equal in the active and dummy gauges regardless of how closely they may be placed.

In my pending application, Ser. No. 36,312 filed June 15, 1960, now abandoned, I describe another method for providing compensation which can be used alone or in conjunction with the dummy gauge system to provide improved compensation in rapidly varying temperatures and where steep thermal gradients occur. This method actually adjusts the thermal coefficient of resistivity of the active strain gauge filaments through heat treatment so that the gauge, when mounted to a paricular metal for which it is adjusted, will provide a very low apparent strain. A unique feature of my weldable strain gauge, as described in U.S. Patent No. 3,141,232, wherein meaningful unmounted apparent strains are provided by the tubular metal sheet, is that such unmounted apparent strain makes heat treatment temperature compensation much easier because a known relation between unmounted sensitivity and the sensitivies when attached to various metals has been established. Thus, heat treatment compensation for use on any well known metal requires only the achievement of a readily measured unmounted sensitivity. The unmounted sensitivity of other completed gauges, such as paper-backed bonded gauges, is not as well defined and more difficult to measure although, of course, the basic temperature sensitivity of the filament wire is measurable. This meaningful unmounted sensitivity contributes also to the new temperature compensation system described hereinafter.

Still another means for eliminating the undesirable effects of temperature on strain measuring gauges and systems does not depend on compensation in the gauge or system although such compensation can be employed in conjunction therewith. This system eliminates the unwanted errors by computation. In modern systems, of course, an electronic computer does the work so rapidly that results are immediately available. This computation compensation system requires (1) that the temperature sensitivity of the gauge or gauges be well defined over the temperature range to be encountered, i.e., a well defined plot of apparent strain vs. temperature must be available from thorough tests under known conditions, and (2) the temperature or temperatures at the point or points of strain measurement must be accurately known at all times when strain measurements are being made.

However, the computerized compensation method requires simultaneous inputs of both temperature and strain, and the simultaneous measurement of strain and temperature at a given measuring point poses some difficult problems in achieving assurance of identical temperatures in the strain gauge and at the point of measurement. It is not possible for the separate sensors to occupy the same space, nor is it easy to design a thermocouple and thermistor having the same heat transfer characteristics. Thus, it would be of immense advantage to have the same sensors measure both temperature and strain. Not only would this provide more assurance for a true temperature indication at the strain gauge for computer compensation, but it also would lessen the cost and complexity of the installation and wiring, since the one device and the same wiring as would now normally be used for only one measurement would serve so that two parameters could be measured.

The use of a single sensor or set of sensors to measure more than one physical quantity is not new. However, in all previously-described systems the single sensor, while capable of measuring two or more variables on a one-at-a-time basis by switching between different circuitry appropriate for each measurement, could not accomplish the multiple measurements simultaneously and continuously, an imperative condition in many modern tests involving steep thermal gradients and rapidly varying temperatures.

There are also a number of other temperature compensating methods for strain gauges and strain measuring systems. The present invention offers an improved method wherein the compensation is readily adjustable to give compensation for any type of material and for rapidly varying temperatures and steep thermal gradients. It is also a general object of the instant gauge system wherein temperature compensation is brought as near to perfection as possible and temperature and strain are monitored simultaneously.

In the achievement of this general object and as a feature of the invention, there is provided firstly a new type strain gauge system which is capable of performing above 650° F.; in fact, performance at 1500° F. or above is easily managed. Prior strain gauges using nickel-chromium wires as a sensing element were capable of unlimited use only to about 650° F. By 750° F. their use was limited to relatively short periods of time; and at 850° F. their temperature compensation was lost because the effect of the heat treatment which produced the temperature compensation was overcome by the high reheating. The result is that if compensated gauges are made according to the principles of the instant invention using the filament alloys heretofore employer, compensation may easily be lost by placing the gauge in an excessively hot environment, or passing excess current through it, or even in the process of welding or brazing the lead wires. Such loss of compensation is quite difficult to restore and, of course, would again be lost at the higher temperatures. At temperatures above 1000° F., however, many metals and alloys are very nonlinear and unstable in their performance characteristics. Their coefficients of resistance not only vary with temperature, but also are subject to "drift" which is to say that the coefficient of resistance wanders even at one temperature point during the operation of the strain gauge.

Accordingly, it is another feature of applicant's invention that strain gauges useful at about 650° F. are provided by the use of an alloy consisting of 92% platinum and 8% tungsten employed as the filament of the gauge. The alloy is stable at 1200° F. and above, exhibiting neither unreasonable non-linearities of resistance, nor coefficient of resistance, nor any tendencies to drift in resistance value while remaining at the same temperature level. Thus, data acquired with platinum-tungsten strain gauges is reliable and repeatable in later tests under the same conditions. A platinum-tungsten wire, however, has a high thermal coefficient of resistance which gives an apparent strain of approximately 5 microinches per degree F. These extremely high thermal sensitivity figures have always been considered prohibitive; but another feature of the invention actually makes use of this high thermal coefficient of resistivity to minimize the effect of these temperature changes to make possible the use of platinum-tungsten alloy in applicant's new high-temperature strain gauge system and to make possible the simultaneous and continuous measurement of strain and temperature.

The means whereby the invention evades the effects of the high resistivity temperature factors of platinum-tungsten filament relates to improvements upon the Wheatstone bridge strain gauge powering and measurement circuit. As stated above, heretofore it was impossible to monitor temperature and strain simultaneously using the same circuit elements for both. According to the principles of the instant invention, however, this monitoring is made possible with a minimum of inaccuracy due to the effect on one reading of the fact that the other reading is being taken at the same time. This is accomplished by deriving a temperature change indication by means of a current meter coupled in series with the voltage source of the Wheatstone bridge, while at the same time deriving an indication of strain by the use of a voltmeter across the output terminals of the Wheatstone bridge. If the voltage source of the Wheatstone bridge is a closely regulated power supply so that the voltage does not vary with change in load, then the change in current flowing through the bridge circuit will be a direct reflection of the change in resistance of the elements of the Wheatstone bridge. If, as will be shown in the detailed description to follow, the strain gauges in the bridge are mounted on the body to be tested in such manner that distortion of the body causes some of the strain gauges to increase in resistance while others are caused to make a corresponding decrease in resistance, the Wheatstone bridge can be arranged so that its total resistance as a function of a strain alone (or force or deflection or whatever else is being measured by the strain gauges) does not change; only the voltage across its output terminals. If the resistance of the Wheatstone bridge does not change as a result of strain in the gauges, then any resistance change will naturally be from temperature change. The result is then that the monitoring of current flow coming out of the Wheatstone bridge power supply will give an accurate indication of the change in temperature affecting the Wheatstone bridge strain gauges. Since all four elements in the bridge will increase or decrease together under the influence of temperature changes, reference to the Wheatstone bridge equations given above will show that change in temperature will have no significant effect on the voltage difference across the output terminals of the Wheatstone bridge, while change in strain will have no significant effect upon the overall resistance across the Wheatstone bridge.

As another feature of applicant's invention, in cases where four active strain gauges cannot conveniently be used on the test body in order to provide the temperature compensation and monitoring effect discussed above, the error-producing effect of strain on the temperature measurement can be compensated out by coupling a feedback loop from the bridge output voltage back to the temperature monitoring galvanometer. Preferably, an isolating and impedance matching amplifier would appear in the feedback loop to prevent any unwarranted effects from the galvanometer upon the output voltage measuring equipment. As an example of an arrangement where resistance change caused by strain could affect the temperature measurement derived by the galvanometer in series with the Wheatstone bridge power supply, a Wheatstone bridge with a single active or strain sensing gauge and with the other three bridge resistors of the inactive or dummy gauge type would have its overall bridge resistance changed by any resistance changes in the single active gauge due to strain because no oppositely placed strain sensing elements are present to cancel out the overall resistance due to strain. In such case, the current due to power supply would be effected to a small degree by any strain being sensed by the system and thus some error would be introduced into the temperature measurement. Such error can, however, be cancelled out by the use of computers feeding back a carefully controlled portion of the Wheatstone bridge output voltage through the isolating and impedance matching amplifier mentioned above into the temperature measuring circuit. In like manner, where the strain gauge system is not properly temperature compensated, a computer feedback loop from the temperature sensor to the output voltage sensor could correct any otherwise uncompensated temperature errors in the strain reading.

As another feature of applicant's invention, as a result of the provision of the above-described temperature compensated circuitry whereby temperature and strain can be measured simultaneously and without undue influence of one measurement upon the other, applicant has developed a strain gauge system of the easily-used "black box" variety whereby an operator need only dial the type of metal being measured and a correction factor applicable to the strain gauges being used to derive on the readout device of the system a correct and error-free strain reading, which by appropriate calibration may be made to indicate weight, distortion, force, pressure, or numerous other parameters derivable from strain gauge change in resistivity.

The best high-temperature filament materials such as platinum-tungsten have very high temperature sensitivities, up to $35\mu$ in./in. ° F. and more and cannot be pre-compensated by heat treatment. Thus, without some outside temperature compensation a change of 100° F. in platinum-tungsten would give an apparent or erroneous strain indication of $3500\mu$. in./in.—an intolerable value well beyond most of the actual strains normally encountered. Therefore, another feature of the instant invention is the addition to prior strain gauge Wheatstone bridge circuitry of two additional resistors of a unique nature as to value and construction. Additional resistors have been used in strain gauge bridges before, but the principles herein disclosed are new and patentably distinct therefrom. A first such resistor, hereinafter referred to as the temperature compensation resistor, is placed in series with one arm of the Wheatstone bridge, preferably an arm having a strain gauge rather than a resistor. (In this discussion, a "resistor" is a bridge element mounted in the test station rather than on the test structure, where it would be subject to temperature variations. "Gauges," active or dummy, are mounted on the test structures.) The second additional resistor, hereinafter referred to as the bridge balancing resistor, is placed in series in another arm of the Wheatstone bridge, preferably an arm having a circuit resistance rather than a strain gauge. The temperature compensation resistor is then selected to be of that value that will correct for all temperature-induced changes in the gauge output resistors, whether originating in the test structure, the gauge structure, the gauge fialment, or the gauge leads. The bridge balancing resistor is selected to compensate the temperature compensation resistor such that the bridge is balanced at some ambient or reference temperature.

Other objects and features of applicant's invention and a better understanding thereof may be had by referring to the following description and claims taken in conjunction with the accompanying drawings in which:

Figure 1A:
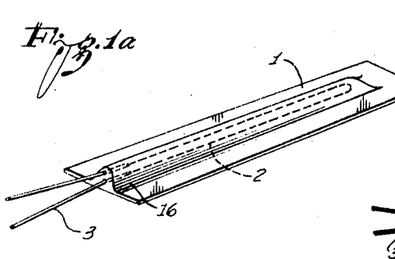
FIGURE 1(a) is a perspective view of a weldable bonded resistance strain gauge of the single filament type such as is discussed in the present application.
Figure 1B:
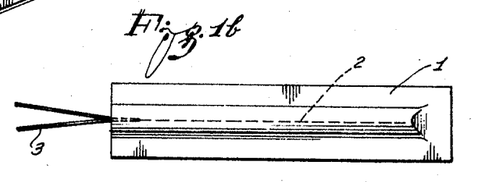
FIG. 1(b) is a plan view of the strain gauge of FIGURE 1(a)

Referring to the various views of FIGURE 1 it is seen that the basic single element weldable gauge consists essentially of a fine wire filament 2, some solid compactible insulation, and a flanged tubular metal shell 1. The filament is axially aligned inside the tube and separated therefrom by the compactible insulation (usually finely ground metallic oxides such as magnesium oxide).

The shell is swaged so as to exert a compressive force inward against the insulation which in turn is forced inward against the wire filament. This swaging effectively locks the components through a frictional effect so that axial strains in the shell result in identical strains in the wire filament. The gauge is attached to a test structure by forming closely spaced spot welds between the flange and the test structure along both sides of the tube. Strains in the test structure are transmitted through the flange to the shell and then through the insulation to the filament. The gauge has maximum sensitivity to strains aligned parallel with the longitudinal axis of the tube and insignificant sensitvity to strains at right angles to this longitudinal axis. Strains in the filament result in resistance changes which can be measured by well known strain gauge circuitry involving the Wheatstone bridge. With proper calibration the measured resistance changes can be accurately interpreted in strain values. Further details of the basic gauge may be had from application, Ser. No. 754,956 filed Aug. 14, 1958, in the name of John D. Russell, now Patent No. 3,245,018.

The gauge of FIGURE 1, in actual practice can be made smaller than a postage stamp. Naturally, one of its most desirable characteristics is that the conductive material used in the filament 14 have the property of linear variation of electrical resistance with strain. Due to the small cost of the gauge and its measuring instruments, thousands may be scattered over all the various structural members of test models and prototypes of airplanes, missiles, automobiles, railroad equipment, bridges and buildings, and all types of machinery. Until the present invention the gauge of FIGURE 1 provide long-term stability only to approximately 700° F. because the usual "Evanohm" filament used for gauges in this temperature range experience a shift in the coefficient of resistivity at temperatures above 700° F. This controllable and reversible shift in the coefficient of resistivity is used in the inventor's earlier applications to provide inherently temperature-compensated gauges in the range of —320° F. to +700° F. See pending applications, Ser. No. 36,304 filed June 15, 1960, in the name of John D. Russell, now Patent No. 3,245,016, and Ser. No. 36,312 filed June 15, 1960, in the name of John D. Russell, now abandoned.

Figures 2A, 2B:
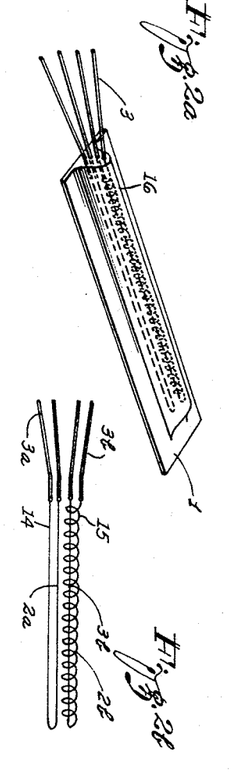
FIGURE 2(a) is a plan view of a dual element strain gauge.
FIGURE 2(b) shows the filament arrangement in the strain gauge of FIGURE 2(a)

The dual element strain gauge of FIGURE 2 is similar in construction to the single element gauge of FIGURE 1, the primary difference being, as the numerical description implies, that the gauge of FIGURE 2 has two filaments 2a and 2b, whereas the gauge of FIGURE 1 has only a single element 2. The arrangement of the two filaments 2a and 2b as shown by FIGURE 2 is very significant. Note that one filament 2a is aligned with the longitudinal axis of the tube while the other filament 2b is coiled and, in effect, approaches a position more nearly at right angles to the longitudinal axis of the shell. Thus, the filament 2a measures strain, while the filament 2b is almost immune to strain and responds only to temperature change.

The dual element gauge, while essential for most strain measuring problems at temperatures above 700° F., is not in itself new. See U.S. application, Ser. No. 153,858 filed by John D. Russell on Nov. 2, 1961, now Patent No. 3,245,017. It is the use of this gauge and structure in conjunction with filament materials having a stable coefficient of resistance over extended temperature ranges to 1500° F. and above and in conjunction with the new temperature compensation system and procedure which makes possible accurate measurement of strains during prolonged tests at temperatures to 1500° F.

The new system provides compensation not only for the apparent strain which would otherwise be caused by the different thermal coefficients of expansion of various materials and possible differences in coefficients of resistivity in the two filaments, but also provides for compensation for any erroneous readings which could be introduced by differences in the changes in lead wire resistances at elevated temperatures. Such differences could occur because of differences in the temperature or length of one power lead wire compared with the other or because of differences in size or resistivity of lead wires. Moreover, the strain gauge of FIGURE 1 could also be useful for measuring applied force as a function of strain and thus could also measure torque, acceleration, weight in many high-temperature fields, such as space atmospheric re-entry and gasoline, jet and rocket engines, were it not for the overpowering effect of temperature-induced apparent strains which would be involved—particularly above 700° F.—without the invention described herein.

Although the use of a dual gauge (or a self-temperature-compensated gauge) of the sort shown in FIGURE 2 solves many problems in the temperature area up to 700° F. for long-term tests, the higher temperatures call for a new compensation system and create a new problem that is not encountered with conventional gauges—the resistance change in strain gauge lead wires due to temperature variations. With conventional strain gauges, if lead wires of the active and dummy gauges are subjected to identical temperature conditions, resistance changes in the leads are cancelled out since they appear in adjacent legs of the Wheatstone bridge circuit.

Thus, the great problem of accuracy with the resistance strain gauge discussed above requires that it be used in a system which provides for or minimizes all inaccuracies due to change in temperature. Temperature inaccuracy with such a gauge arises whenever the gauge produces during operation a false strain reading as a result of several factors. For example, the resistance of most of the conductive materials used in bonded resistance strain gauge filaments changes with temperature and also the thermal coefficient of expansion of the strain gauge filament will often be different from that of the structure to which it is bonded. Furthermore, errors result from other sources such as lead wire error.

As stated above, the high temperature objective of applicant's invention requires that a strain gauge system be provided which is capable of performing above 650° F. and, in fact, performs at 1500° F. or above. This is greatly desired due to the need therefor in many industrial applications. As previously described, prior art strain gauges using nickel-chromium wires as a sensing element are capable of unlimited use only to about 650° F., while by 750° F. their use is limited to short periods of time and by 850° F. their temperature compensation (at least by presently-known heat treatment methods) is lost because the effect of the heat treatment which produced the temperature compensation was overcome by the high reheating. Because of this, the problem at high temperatures is that if compensated gauges are made using the filament alloys heretofore employed, compensation may easily be lost by subjecting the gauge to excessively hot environments or excess currents. Another problem is that at temperatures above 1000° F., nearly all metals and alloys are very nolinear and unstable in their performance characteristics, their coefficients of resistance exhibiting not only variation with temperature but also "drift" even at a constant temperature point during the operation of the strain gauge.

In the solution of these high temperature problems, applicant's invention provides strain gauges useful above 650° F. by the use of an alloy consisting of 92% platinum and 8% tungsten in the filament 14 of the gauge of FIGURE 1. This alloy is stable at 1200° F. and above, exhibiting neither unreasonable nonlinearities of resistance nor coefficient of resistance nor any tendencies to drift in resistance value while remaining at the same temperature level. Thus, the data acquired at high temperatures with platinum-tungsten strain gauges is reliable and repeatable in later tests under the same conditions, if only the high temperature effects can be cancelled out. It should be noted that platinum-tungsten wire has a change in length factor ($\Delta l$) of approximately 35 microinches per degree F., making its change in resistance as a function of a change in temperature 120 microohms per ohm per degree F. These extremely high thermal sensitivity figures have been neutralized by other principles of the invention discussed below, thus cutting down and almost eliminating the effect of temperature changes to make possible the use of platinum-tungsten alloy in applicant's new high temperature strain gauge system. Of course, other metals ar alloys having the required stability in the coefficient of resistivity and a high coefficient of resistivity are usable.

Figures 3, 4:
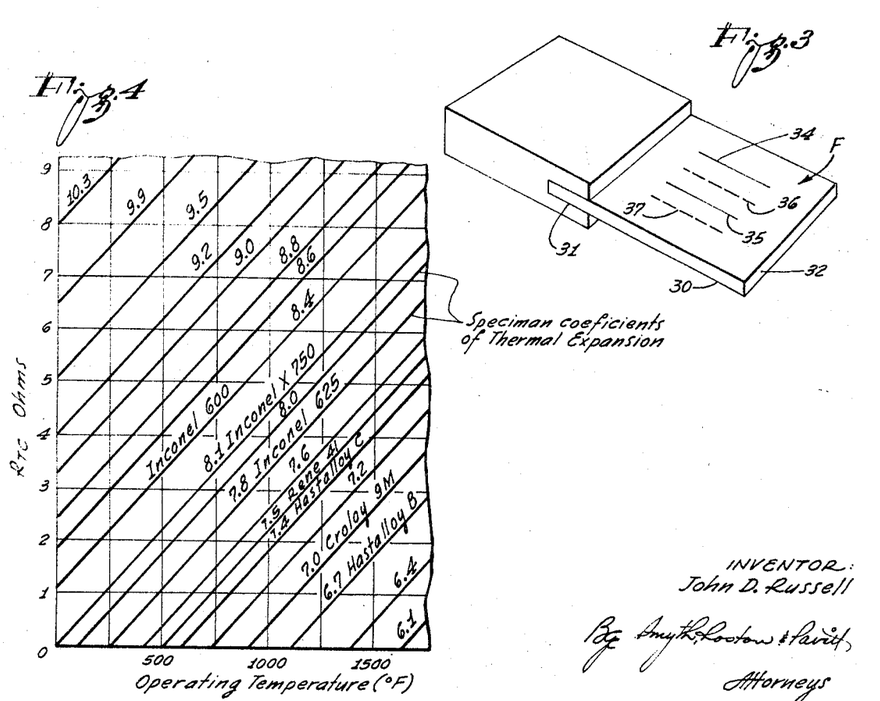
FIGURE 3 is a perspective view of a schematic beam deflection strain mounting for the strain gauges discussed herein.
FIGURE 4 shows resistor-gauge selection curves according to the invention.

Referring to FIGURE 3, a typical strain gauge installation upon a beam 30 having a solidly fixed end 31 and deflected by a force F applied at a second end 32 might use four single element strain gauges, two mounted on the top of the beam 30 (34 and 35) and two mounted on the bottom of the beams 30 (36 and 37). It is a well-known principle of structural engineering that the force F applied downward at the end 32 of the beam 30 will cause the beam 30 to deflect downward so that the upper surface upon which the strain gauges 34 and 35 are mounted will be placed under tension and the outer layers of molecular structure thereof will elongate. Conversely, the lower surface of the beam 30 upon which the strain gauges 36 and 37 are measured will be placed under a compressive force and will tend to contract. Theoretically, therefore, and to a substantial degree, whenever the strain gauges 34 through 37 are all equal the increase in resistance of the strain gauges 34 and 35 in the arrangement of FIGURE 3 will be matched by the decrease in resistance of the strain gauges 36 and 37. As one specific application of the FIGURE 3 configuration, the gauges 34–37 had a nominal ambient temperature value of 100 ohms. Under load, the guages 34 and 35 went up to approximately 101 ohms, the gauges 36 and 37 went down to approximately 99 ohms. (At 1000° F., their resistance would all be approximately 120 ohms).

Figure 5:
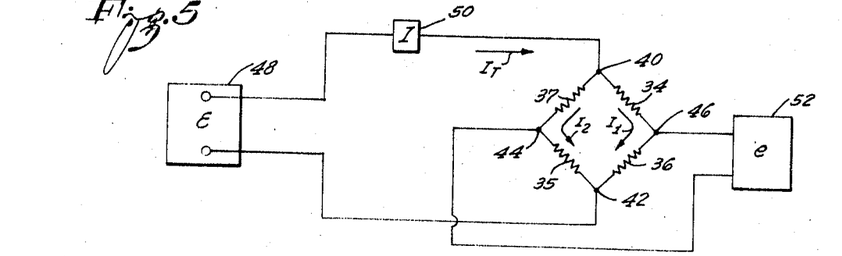
FIGURE 5 is a schematic diagram of the electrical system wherein the strain gauges of FIGURE 3 might be electrically connected.

Referring to FIGURE 5, the electrical system in which the resistors 34–37 of FIGURE 3 are coupled is a Wheatstone bridge aranged as discussed above, but with the change that all four bridge resistors are active strain gauges; that is to say, the gauges 34–37 welded to the top and bottom surfaces of the beam 30 of FIGURE 3. The Wheatstone bridge has input terminals 40 and 42 and output terminals 44 and 46. A power supply 48 is coupled across the input terminals 40 and 42. The power supply 48, as stated above, must be very constant in its voltage output if simultaneous temperature and strain measurement are to be practiced according to the principles of the invention. The total current passing through the Wheatstone bridge of FIGURE 5 is monitored continuously at 50 by a galvanometer or other curent measuring device which is coupled in series with the power supply 48 and the bridge input terminal 40. The unbalance of the Wheatstone bridge of FIGURE 5 is also monitored continuously by a voltmeter or other voltage measuring device 52 coupled across the output terminals 44 and 46 of the Wheatstone bridge.

In the operation of the strain gauge system as shown in connection with FIGURES 3 and 5, a steady and unvariable voltage E is applied by the power supply 48 across the input terminals 40 and 42 of the Wheatstone bridge of FIGURE 5. Alternatively, a constant current source could be used at 48. It can be seen that this voltage E is thereby applied across the series combination of the strain gauges 34 and 36 to produce a current $I_1$ and is also applied across the series combination of the resistors 37 and 35 to produce a current $I_2$, both the currents $I_1$ and $I_2$ flowing from the input terminal 40 and the two legs of the Wheatstone bridge to the input terminal 42. Outside the Wheatstone bridge the currents $I_1$ and $I_2$ combine to flow from the input terminal 42 of the Wheatstone bridge through the power supply 48 and current measuring device 50 and back to the input terminal 40 of the Wheatstone bridge in a combined current I representing the summation of the branch currents $I_1$ and $I_2$. It is one feature and advantage of the instant invention that this current I is continuously monitored at 50. (If a constant current power supply were used, the voltage across the terminals 40, 42 would be monitored instead.)

As stated above, applicant's high-temperature platinum-tungsten filaments have a very high thermal coefficient of resistivity and thus require further temperature compensation in their supporting electrical systems or the like. Heretofore, this would have been accomplished by making separate measurements of the temperature involved and computing correction factors for each item of data, a process not only painstaking and almost prohibitive of the use of large numbers of strain gauges, but also subject to great inaccuracy because of the uncertainty of the temperature measurement, even if a very closely spaced thermocouple is used. If the same strain gauges are used to montor both temperature and strain, the accuracy is still very uncertain and subject to gross yet undetectable errors because it has been necessary heretofore to switch between the measuring circuits for strain and the measuring circuits for temperature, so that the two could never be monitored continuously and simultaneously. Especially in the case of measurements of high-frequency dynamic strain and in rapidly varying temperature with steep thermal gradients, such a procedure could provide some badly deviant temperature and strain figures.

To see how continuous temperature and strain monitoring can occur in the system of FIGURES 3 and 5 and in many other situations similar to it, one need only consider the following equations which hold true while the Wheatstone bridge is in operation:

(1) $\quad e = R_{35}I_2 - R_{36}I_1 = R_{34}I_1 - R_{37}I_2$ (2) $\quad E = (R_{34}+R_{36})I = (R_{37}+R_{35})I_2$ (3) $\quad I = I_1 + I_2$ Therefore, by substitution:

(4) $\quad I = E\left(\dfrac{R_{34}+R_{36}+R_{35}+R_{37}}{R_{34}+R_{36}+R_{35}+R_{37}}\right)$ I is the variable measurement at 50 to determine changes in resistance or apparent strain reading temperature change within the gauges 34–37. In the strain gauge arrangement of FIGURE 3, if the gauges 34–37 are identical and the strains imposed on the top pair (34 and 36) are equal and opposite the strains on the bottom pair (35 and 37) so that the change in resistance ($\Delta R$) is the same for all four, then the change in $(R_{34}+R_{36}+R_{35}+R_{37})$ with a change in temperature will be $(R_{34}+\Delta R_t)+(R_{35}+\Delta R_t)+(R_{36}+\Delta R_t)+(R_{37}+\Delta R_t)$ minus $(R_{34}+R_{36}+R_{35}+R_{37})$, to give a change in resistance of $4\Delta R_t$. The change in $(R_{34}+R_{36}+R_{35}+R_{37})$ with change in strain will be $(R_{34}+\Delta R_s)+(R_{36}+\Delta R_s)+(R_{35}-\Delta R_s)+(R_{37}-\Delta R_s)$ minus $(R_{34}+R_{36}+R_{35}+R_{37})$ to give a change of zero. The result is that for small resistance changes (with which the denominator of Equation 4 can be ignored as de minimis), the total current I changes by the sum of the resistance changes due to changes in temperature, yet is unaffected by resistance changes due to strain.

As for e, the strain measurement, examination of Equation 1 shows that temperature compensation is substantially complete in the system of FIGURES 3 and 4:

(1) $\quad e = R_{35}I_2 - R_{36}I_1 = R_{34}I_1 - R_{37}I_2$ therefore (5) $\quad e = E\left(\dfrac{R_{34}R_{35}-R_{36}R_{37}}{(R_{34}+R_{36})(R_{35}+R_{37})}\right)$ Conversely to the analysis above, the $\Delta R_t$ terms cancel out in Equation 5, while the $\Delta R_s$ terms, being opposite in sign for $R_{34}$ and $R_{35}$ as against $R_{36}$ and $R_{37}$, cause a net change in the reading e which then is strain-induced and temperature-free.

Accordingly, the simultaneous and continuous measurement of both strain and temperature using the same set of sensors for both variable is readily accomplished with negligible cross talk (i.e., negligible error in temperature readings introduced by strains and vice versa) when the four active elements 34–37 from the bridge circuit with each element having equal (in magnitude and sign) and relatively high thermal coefficients of resistance and with such element subjected to approximate equal strains but with the strains in 1 and 3 opposite in phase to those in 2 and 4. FIGURE 3 showing such a combination of gauges on a cantilever beam is but one example of such an arrangement.

The voltage of the junctions 40, 42 of elements 34–37 is closely regulated. The bridge current measuring device 50 is of low impedance and the bridge output voltage measuring device 52 is of high impedance. The result is that the bridge output voltage e varies with beam 30 loading or strain (or force or deflection), but the total bridge current I is not affected significantly by these changes in beam 30 loading because when $R_{34}$ and $R_{35}$ increase, $R_{36}$ and $R_{37}$ decrease, leaving no significant change in overall bridge resistance $R_{40}$, $R_{42}$ and no significant change in total bridge current $I_T$.

On the other hand, the effect of temperature changes which affect all the elements 34–37 equally for slowly varying temperatures is that there is no significant change in the bridge output voltage because all the elements 34–37 are affected equally in magnitude and direction, while the total bridge resistance $R_{40}$, $R_{42}$ is changed with temperature. Since E remains constant, there is a change in total bridge current $I_t$ with any such $R_{40}$, $R_{42}$. This change in bridge current $I_t$ can be monitored as at 50 to indicate temperature.

To summarize, in the arrangement of FIGURE 3 using the four active elements 34–37, strains affect bridge output voltage but not total bridge current and temperature changes affect total bridge current but not bridge output voltage. Thus strains (or force or deflection or acceleration, etc.) can be monitored by monitoring bridge output voltage simultaneously and continuously with the monitoring of total bridge current or temperature.

The simultaneous temperature and strain monitoring system of FIGURE 3 is an important addition to the strain gauge temperature compensation area, but in the use of the above-mentioned high-temperature platinum-tungsten gauges of the dual type illustrated in FIGURE 1, where each dual gauge forms one-half of the Wheatstone bridge of FIGURE 5, certain errors arise. The largest error due to temperature in such a dual gauge arrangement occurs when the coefficient of expansion of the platinum-tungsten gauge is not the same as that of the test structure. For example, if the test material expands more than the gauge for the same change in temperature, the material will force the active filament 14 to give a strain indication that is basically induced by free thermal expansion rather than by load-induced strain of the test surface. On the other hand, this temperature-induced differential elongation of the test surface will not cause any change in the dummy filament 15, so that even a supposedly temperature-compensated dummy gauge such as that discussed above will not compensate temperature errors due to different coefficients of expansion in the test surface and in the gauge itself. If the dual gauge affected by this factor is connected as a half of a Wheatstone bridge (i.e., between the terminal 40 and the terminal 42), such a temperature error will affect the reading $e$ taken at 52. Other such unwanted temperature-induced changes in the reading $e$ taken at 52 can be induced when the thermal coefficients of resistivity of the active filament 14 and the dummy filament 15 are not exactly alike or when the leads to the filaments 14 and 15 do not behave in exactly the same way with changes in temperature.

Figure 6:
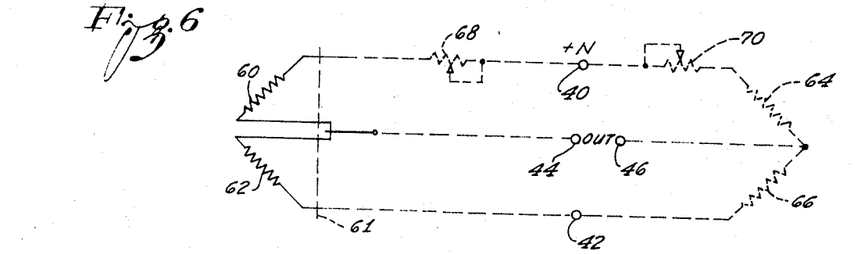
FIGURE 6 is a schematic diagram of a Wheatstone bridge circuit with additions according to the principles of the instant invention.

FIGURE 6 is a schematic of a Wheatstone bridge wherein the above-described temperature problems are solved. The bridge shown there has the usual input terminals 40 and 42 discussed in connection with FIGURE 3 and output terminals 44 and 46. The dual gauge is represented by two resistors 60 and 62 connected between the input terminal 40 and the input terminal 42 and having their junction point coupled to the output terminal 44. A dotted line 61 divides the dual gauge portion of the bridge from those elements of the bridge within the test set and, therefore, not subject to the temperature changes of the test material. Within the test set, of course, are the other two legs of the Wheatstone bridge represented by the resistor 64 connected between the input terminal 40 and the output terminal 46 and resistor 66 connected between the input terminal 42 and the output terminal 46.

As discussed above, the thermal errors to which the circuit of FIGURE 6 are addressed arise because the active resistor 60 undergoes temperature-induced changes in resistance that the dummy resistor 62 does not duplicate. The solution of this problem is accomplished by a compensation resistor 68 (designated in the subsequent equations as $R_{TC}$) coupled in series with the active filament resistor 60, and in cooperation therewith a resistor 70 (designated in the subsequent equations as $R_B$) balancing the bridge. In one often-used bridge circuit, the resistances 60–66 are all 100 ohms nominal, while $R_{TC}$ and $R_B$ are generally of an identical value for both. This value varies with the type of material to be tested and other factors such as lead resistance. The value is in the range of 5 to 15 ohms.

It should be pointed out that the addition of a series $R_{TC}$ changes the overall gauge factor of the $R_G$–$R_{TC}$ system. For example, if a gauge has a gauge factor of 4.0

$$\left(\text{i.e., } \frac{\Delta R/R_3}{\Delta L/L} = 4.0\right)$$

and $\Delta R$ was 1 while $R_G$ was 100, the addition of an $R_{TC}$ of 10Ω would give $$\frac{\Delta R}{R_G + R_{TC}} = \frac{1}{100+10}$$

instead of $$\frac{\Delta R}{RG} = \frac{1}{100}$$

This does not represent a significant loss of the desired high gauge factor, however.

One gauge usable with the presently disclosed method for achieving temperature compensation where steep thermal gradient, high temperature and rapidly changing temperatures occur is the dual element of FIGURE 2 wherein the straight strain sensing element 14 and the coiled dummy element 15 are of a material having a high coefficient of resistance, such as platinum-tungsten alloy. To explain the unique method of using $R_{TC}$ for achieving strain gauge temperature compensation, one should first consider the formula for the output from the gauge portion 60–62 of the Wheatstone bridge of FIGURE 6 where $$e_{out}/V_{in} = \frac{1}{4}\left(\frac{\Delta R_{60}}{\phi R_{60}} - \frac{\Delta R_{60}}{R_{62}}\right)$$

When the gauge of FIGURE 1 is used to measure strain under constant temperature conditions, the strains parallel with the longitudinal axis of the active filament 14 provide resistance changes in $$\frac{\Delta R_{60}}{R_{60}}$$

but negligible changes in $$\frac{\Delta R_{62}}{R_{62}}$$

Thus $$\frac{\Delta R_{60}}{R_{60}}$$

is much larger than $$\frac{\Delta R_{62}}{R_{62}}$$

and there is a signal $e/V$ proportional to strain. In fact, $e/V$ is approximately equal to $$\frac{1}{4}\left(\frac{\Delta R_1}{R_1}\right)$$

To achieve temperature compensation, the respective changes in $R_{60}$ and $R_{62}$, $\Delta R_{60}$ and $\Delta R_{62}$, caused by temperature changes must be such that $$\frac{\Delta R_1}{R_1} = \frac{\Delta R_2}{R_2}$$

so that the righthand side of equation under discussion is zero—i.e., $E/V$=zero for changes due to temperature.

If only the free elements of the same material and initial resistance were involved, $$\frac{\Delta R_{60}}{R_{60}}$$

would equal $$\frac{\Delta R_{62}}{R_{62}}$$

because only the coefficients of resistivity would be involved in the change in resistance. However, when such a gauge as that of FIGURE 1 is assembled in its shell 16, the change in resistance with temperature is not equal for active and dummy filaments 14 and 15 because of the differential of expansion between metal shell 16 and wires 14, 15 and the different alignment of the wires 14, 15. In the assembled condition the active filament 14 parallel with the longitudinal axis of the tubular shell generally experiences a greater increase in resistance with the temperature than the coiled dummy element 15.

Thus, while $R_{60}$ and $R_{62}$ are initially approximately equal, the $\Delta R_{60}$ resulting from a given $\Delta T$ is larger than $\Delta R_{62}$ for the same $\Delta T$. If uncorrected, then the formula $$e/V = \frac{1}{4}\left(\frac{\Delta R_{60}}{\Delta R_{60}} - \frac{\Delta R_{62}}{\Delta R_{62}}\right)$$

will, since $R_{60}$ is larger than $R_{62}$, have an undesirable value of $e/V$ as related to varying test temperatures T.

To alleviate this condition the resistor $R_{TC}$ is connected in series with $R_{60}$; that is, $R_{60}$ is increased in value so that $$\frac{\Delta R_{60}}{R_{60} + R_{TC}}$$

becomes smaller and more nearly equal to $$\frac{\Delta R_{62}}{R_{62}}$$

so that $e/V$ is once again equal to zero. This is the basic principle of the inventive compensating system as far as using $R_{TC}$ is concerned. Of course, any one setting or selection of $R_{TC}$ will preserve this condition ideally only over a certain temperature range because of the nonlinear characteristics of temperature-induced variables. Preferably, the addition of a resistor $R_{TC}$ is made in series with the filament of the gauge of FIGURE 1 showing the highest $\Delta R/\Delta T$. Once $R_{TC}$ is selected, placed and adjusted, the resistor $R_B$ of similar value may be used at the appropriate position in the bridge circuit to keep the initial bridge balance near zero.

It should be noted the lead wire resistances and the coefficient of resistivity of the portions of the lead wire resistances within the test temperature environment have an effect on the value of the compensating resistor $R_{TC}$. To achieve optimum overall compensation it is best to calibrate $R_{TC}$ with the identical leads which will be used during test conditions. It will be seen, then, that the use of an adjustable or selectible temperature compensation resistor as taught by the instant invention will compensate for all temperature-induced error in strain readings, because $R_{TC}$ can be determined in the testing environment. The procedure would be set up to the test apparatus, test structure, strain gauges and bridge circuiting, and then just before imposing a test load on the test structure, adjusting $R_{TC}$ and $R_B$ to balance the bridge. Thereafter, at any time during testing when temperature compensation of the strain gauges may have changed significantly, similar adjustments may be made. In many cases heating an entire structure such as a missile or component thereof is not only difficult or impractical but is also ineffective because one cannot be certain that free thermal expansion is obtained during temperature changes so that no accurate check on compensation is possible.

Here, as in applicant's inherently compensated gauge (see U.S. applications, Ser. No. 36,304, now Patent No. 3,245,016, and Ser. No. 36,312, now abandoned), the fact that the weldable gauge structure has a meaningful and repeatable unmounted temperature sensitivity which can be accurately determined makes the selection of the compensation resistor quite simple and accurate and helps to assure compensation of the gauge after installation.

Each gauge, in many cases complete with an integral lead structure 3, can be subjected to known temperature cycles in the unmounted condition and the unmounted apparene strain vs. temperature recorded. As in the case of the inherently compensated gauge, this unmounted apparent strain vs. temperature curve has a repeatable relation with the mounted apparent strain for a given material. Charts have been prepared which permit selection of the proper resistance value $R_{TC}$ for any known combination of unmounted sensitivity and any one of several commonly used test materials and gauge shell material.

Thus, as shown in FIGURE 4, a chart can be made up for any gauge in which the ordinate is operating temperature and the abscissa is the value of $R_{TC}$. A series of linear curves may than be drawn up by experimentation to set the $R_{TC}$ value for a certain operating temperature of a test surface having a certain coefficient of thermal expansion. Naturally all the commonly used test surfaces will have special curves, as for example, the curve for Rene 41, which has a temperature coefficient of expansion of 7–5. In FIGURE 6, therefore, the gauge elements 60 and 62 and the resistors 64 and 66 are the main bridge arms, tlthough portions of $R_{TC}$ are combined with 60 and 62 to form the complete 1–2 arms and portions or $R_B$ are used to complete the $R_6$—$R_6$ arms.

$R_{TC}$ can serve both as a means for adjusting temperature compensation—i.e., eliminating most of the effects of temperature on strain measurement regardless of the material tested—and as a current shunt, so that the voltage across it is proportional to current in the strain gauge side of the bridge of FIGURE 6 and therefore an indication of temperature, since increasing temperatures increases the strain gauge arm resistance and therefore decreases current therethrough.

$R_B$ acts to provide an initial balance adjustment. $T_T$ and $R_B$ can be operated separately or they could be a dual or gauged potentiometer, so that adjustments in $R_{TC}$ would automatically be accomplished by the approximate required change in $R_B$ bridge balance. A second bridge balance potentiometer or vernier could then be used for final balance adjustment.

It should be noted that adjustment of $R_{TC}$ eliminates most of the objectionable effects of temperature compensation or strain measurement, atlhough there is, with this circuit of FIGURE 6, some erroneous temperature indication with strain changes since $R_{60}$ and $R_{62}$ are not affected equally and oppositely by strains as is the case in the bending beam of FIGURES 3 and 5. There the strains result in relatively high resistance changes in $R_{60}$ and negligible changes in $R_{62}$, so that there is a net resistance change in the 60–62 half of the Wheatstone bridge, just as there would be in the case of temperature change. Thus, without further compensating techniques there would be false temperature indications of fairly low value from strains. Typically, with platinum-tungsten filaments $2a$ and $2b$ in the dual element gauge of FIGURE 2, the error from this source would be approximately 20° F. for a $1000\mu$ in./in. strain. Should this temperature error become objectionable, as it would be in many of the more accurate tests, it can be reduced to less 1° F. by feeding the output or a portion thereof of the bridge through a high impedance isolation amplifier into the temperature sensing circuit in the proper phase relation to cancel the erroneous temperature indication, as is shown at 80 of FIGURE 5.

Figure 7:
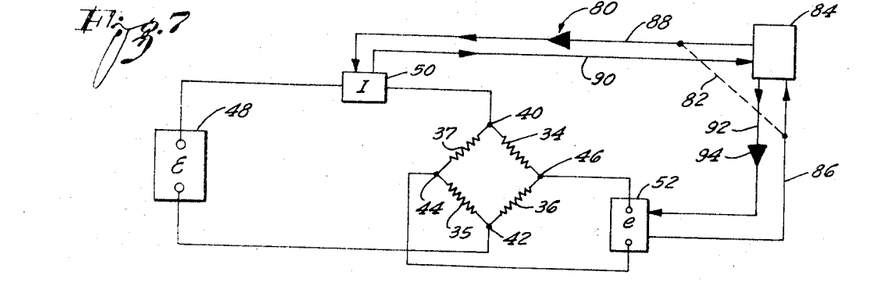
FIGURE 7 is a schematic diagram of a temperature compensated strain gauge electrical system with feedback according to the principles of the instant invention.

In FIGURE 7 the Wheatstone bridge circuit and monitoring components of FIGURE 5 reappear, but with the addition of feedback loops whereby signals developed by the current measuring station 50 and the voltage measuring station 52 may be interchanged in order to correct for various minor errors that under certain conditions would produce objectionable test results. Accordingly, the same constant voltage supply 48, input terminals 40, 42, and output terminals 44, 46 define the Wheatstone bridge of FIGURE 7. As in the case of FIGURE 5, the bridge resistances 34–37 are all assumed to be active strain gauge filaments in some compensating arrangements such as that of FIGURE 3. However, the feedback principles illustrated by FIGURE 7 will apply equally well when two active filaments and two bridge resistors are used in the positions 34–37 or where, as in FIGURE 6, two bridge resistors, an active filament and a dummy filament are employed.

The most important feedback loop to be added to the circuit of FIGURE 5 is that shown in FIGURE 7 passing from the voltage measurement device 52 through the amplifier 80 to the current measurement device 50. A dotted line 82 shows how this loop could be accomplished without the intervention of a computer shown at 84. For a close correction of errors in both current and voltage measurement, however, the computer 84 and two feedback loops should be used. The first such loop would take information from the voltage measurement device 52 and feed it to the computer 84 through the line shown at 86. The computer 84 would then develop a signal to be fitted to the line 88 to correct the output reading of the current measurement device 50. A second such feedback loop would take information from the current measurement device 50 and feed it to the computer 84 through the input line 90. The computer 84 would then develop a signal adequate to correct the reading of the voltage measurement device 52. This signal would be fed to the voltage measurement device through a line 92 including an amplifier 94 for isolating the voltage measurement device 52. The adjustment of the computer 84 would be such as to cancel out known or calculable errors at certain points in the test range with the result that errors at other points in the test range nearer to the point of cancellation would be greatly minimized.

Figure 8:
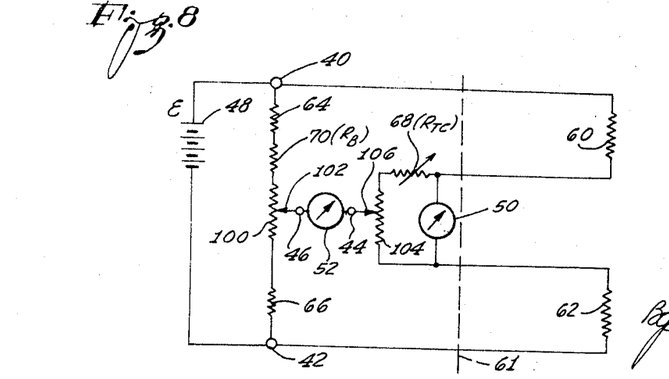
FIGURE 8 is a schematic diagram of an efficient and easily usable test set according to the principles of the instant invention.

FIGURE 8 shows an easily usable and readable "black box" strain gauge system according to the principles of the invention. As in FIGURES 5 and 7, the power supply E is denoted by the numeral 48, the input terminals to the bridge by the numeral 40 and 42, and the voltage output measurement device by the numeral 52. The output terminals 44 and 46, the dividing line 61 and the bridge resistances 60, 62, 64, 66, 68 and 70 are most easily understood by reference to the discussion of the elements of the same numeral designations discussed in connection with FIGURE 6. It can be seen that current measurement to monitor temperature change in the test environment is performed in the bridge arm rather than between the power supply 48 and the bridge input terminal 40, as described above.

The novel features of the "black box" circuit of FIGURE 8 are two variable resistors 100 and 104 having movable wipers 102 and 106. The wipers 102, 106 are connected to the bridge output terminals 44, 46 across which the output voltage measurement device 52 is connected; while the resistors 100 and 104 are connected where the terminals 44, 46 themselves would have appeared in the circuit of FIGURE 4. The resistor 100 then is in series with the bridge resistors 64 and 66 and the $R_B$ 70; and the resistor 102 is in series with the active filament 60, the dummy filament 62 and the $R_{TC}$ 68.

The result of this arrangement of the variable resistors 100 and 104 is that by simple setting of the slides 102 and 106, the bridge of FIGURE 8 can be compensated and recompensated over and over for a wide variety of combinations of filament material (14, 15), gauge base material (16), test structure material, and temperature ranges. It is contemplated that for a given test set, the more commonly met of such combinations will be carefully calculated in advance and set forth in the test set manual, so that even very inexperienced and technically unsophisticated operators may use the test set of FIGURE 6 (hence its appellation "black box"). Moreover, temperature compensation with such a strain gauge system is far less time-consuming: a matter of a few seconds for adjusting the slides 102, 106, rather than hours for calculation, gauge compensation, or other such prior techniques.

In a particular example of the test circuit of FIGURE 8, the bridge resistances 60, 62, 64 and 66 are all of the nominal value of 100 ohms. Both $R_{TC}$ 68 and $R_B$ 70 are 0 to 15 ohms, while the variable resistors 100 and 104 are 25 ohm pots. Thus the effective $R_{active} + R_{TC}$ made up in series between the input terminal 40 and the output terminal 46 can be varied between 100Ω and 125Ω; while the resistance between the output terminal 46 and the input terminal 42 will vary inversely between 125Ω down to 100Ω. The effective $R_{TC}$ then is variable between 0 ohm and 25 ohms. Since these same figures will be true for the effect of the variable resistor 100 on effective $R_B$, the test set of FIGURE 8 can be seen to be a very versatile and yet easily operated instrument. These values may, of course, be varied considerably to suit other test conditions or materials. It should be noted that there might conceivably be combinations of materials and conditions where $R_B$ and $R_{TC}$ would be in the other bridge arms, i.e., $R_B$ adjacent to $R_{66}$ and $R_{TC}$ adjacent to $R_{62}$. However, the arrangement shown is preferred.

In summary, it is the overall accomplishment of the instant invention to provide for the first time a resistance strain gauge system usable at high temperatures (over 850° F.) and also to set forth several principles which alone or in combination are improvements in strain gauge temperature compensation technique at all temperature levels. As stated above, as useful as the bonded resistance strain gague is, it would be limited in worth if it were not used in a system which provided for minimized inaccuracies due to change in temperature. This is due not only to the fact that the resistance of most of the conductive materials used in bonded resistance strain gauge filaments changes with temperature, but also because the thermal coefficient of expansion of the strain gauge filament will often be different from that of the test structure to which it is bonded, so that expansion or contraction of the test structure will apply a temperature-induced strain. Thus, even if the filament of the strain gauge were not directly temperature sensitive because of its change in resistance with change in temperature, it would still be subject to false strain indications with temperature unless it has a coefficient of expansion of the surface to which it is bonded. Such matching is often done but is both difficult and expensive because a strain gauge matched to one metal is greatly in error if bonded to another. Moreover, at test temperatures above 650° F. the heat treatment by which the filament of the strain gauge is matched to its specified test metal is nullified; and at such temperature levels Nichrome or Evanohm, the usual filament materials, begin to exhibit non-linearity and drift.

Since temperature changes also result in resistance changes in a gauge filament, it is imperative that some means be employed to cancel the effects of these temperature changes from the strain measurements. The resistance changes which accompany temperature changes are caused not only by the thermal coefficient of resistivity of the wire filament, but also by the differences in the linear coefficients of expansion of the wire and test structure. Thus, the temperature sensitivity of a particular gauge will vary according to the operating temperature and the material to which it is affixed, and any useful compensating system must be workable with a wide range of temperatures and of test materials.

In the above-described Wheatstone bridge setup, temperature compensation was heretofore accomplished by installing a second strain gauge, also known as the inactive or "dummy" gauge, in an unstrained position on the same type of material as that to which the active strain gauge is bonded. If the two pieces of material are subjected to the same temperatures during testing, both gauges will experience identical thermal resistance changes. This is true whether resistance changes occur due to the change in temperature coefficient of resistance of the conductor in the gauges or due to the differential expansion existing between the gauges and the metal to which they are bonded. As a practical matter, the dummy gauge is often connected on the same surface as the active strain gauge, but with its filament perpendicular to the filament of the active gauge or hanging loosely so that the strains in the surface (assuming they occur only in the same line as the filament of the active gauge) will not affect the filament of the dummy gauge.

There are also a number of other temperature compensating methods for strain gauges and strain measuring systems. The present invention offers an improved method wherein the compensation is readily adjustable to give compensation for any type of material and for rapidly varying temperatures and steep thermal gradients without using special resistors at the test structure, i.e.—by using the gauge filaments only at the structure. Also,—the inventive principles permit strain measurement with greater accuracy at higher temperatures than were heretofore possible. It is also an accomplishment of the instant invention to provide a temperature compensated strain gauge system wherein temperature compensation is brought as near to perfection as possible by feedback to the monitoring instruments and where temperature and strain are monitored simultaneously.

Present strain gauges using nickel-chromium wires as a sensing element are capable of unlimited use only to about 650° F. By 750° F. their use is badly limited; and at 850° F. their temperature compensation will be lost, because the effect of the heat treatment which produced the temperature compensation was overcome by the high reheating. The result is that if gauges are made using the filament alloys heretofore employed, compensation may easily be lost by placing the gauge in an excessively hot environment, or passing excess current through it, or even in the process of welding or brazing the lead wires. Such loss of compensation is very difficult to restore—in some cases impossible—and, in any event would be again lost at these temperatures. At temperatures above 1000° F., moreover, nearly all metals and alloys are very nonlinear and unstable in their performance characteristics. Their coefficients of resistance not only vary with temperature but also are subject to "drift" which is to say that the coefficient of resistance wanders even at one temperature point during the operation of the strain gauge.

Accordingly, it is an important feature of applicant's invention that strain gauges useful above 650° F. are provided by the use of an alloy consisting of 92% platinum and 8% tungsten or thereabouts employed as the filament of the gauge. This alloy has been used in other strain gauges, but only here, with the present invention of gauge structure in combination with compensating circuitry has its use resulted in accurate, easily accomplished temperature compensation. Furthermore, it was impossible to monitor temperature and strain simultaneously using the same circuit elements for both. According to the principles discussed in connection with FIGURE 5, however, this monitoring is made possible with a minimum of "cross talk" (inaccuracy stemming from the effect on one reading of the fact that the other reading is being taken at the same time) by deriving a temperature change indication by means of the galvanometer 50 coupled in series with the voltage source 48, while at the same time deriving an indication of strain by the use of the voltmeter 52 across the output terminals 44, 46 of the Wheatstone bridge. If the voltage source E of the Wheatstone bridge in a closely regulated power supply is produced so that the voltage does not vary with change in load, then the change in current I flowing through the power supply will be a direct reflection of the change in resistance of the elements 34–37 of the Wheatstone bridge. If the strain gauges 34–37 in the bridge are mounted on the test structure 30 in such manner that distortion of the body 30 causes some of the strain gauges to increase in resistance while others are caused to make a corresponding decrease in resistance, the Wheatstone bridge of FIGURE 5 can be arranged so that its total $R_{40-42}$ as a function of a strain alone does not change; only the voltage $e$ across its output terminals 44, 46 changes. If the overall input resistance $R_{40-42}$ of the Wheatstone bridge does not change as a result of strain in the gauges 34–37, then any resistance change will naturally be from temperature change. The result is then that the monitoring of current flow I coming out of the Wheatstone bridge power supply 48 will give an accurate indication of the change in temperature affecting the Wheatstone bridge strain gauges 34–37. Of course, any system to detect overall resistance changes in the bridge circuit could be used to monitor temperature.

Since all four elements 34–37 in the bridge will increase or decrease together under the influence of temperature changes, reference to the Wheatstone bridge equations given in the main discussions will show that change in temperature will have no significant effect on the voltage difference $e$ across the output terminals 44, 46 of the Wheatstone bridge, while change in strain will have no significant effect upon the overall resistance $R_{40-42}$ across the Wheatstone bridge.

In achieving high temperature strain gauge measuring capabilities, it was a major consideration that the best high temperature filament materials, such as platinum-tungsten, have very high temperature sensitivities, up to $35\mu$ in./in.° F. and more and cannot be precompensated by heat treatment. Thus, without some outside temperature compensation, a change of 100° F. in platinum-tungsten would give an erroneous strain indication of $3500\mu$ in./in.—a value well beyond most of the actual strains normally encountered. Therefore, another feature of the instant invention is the addition to prior strain gauge Wheatstone bridge circuitry of the two additional resistors $R_{TC}$ and $R_B$, both of a unique nature as to value and placement in the circuit. Additional resistors have been used in strain gauge bridges before, but they have required a special resistor in or at the gauge aside from gauge filaments and the principles herein disclosed are new and patentably distinct therefrom. A first such resistor, the temperature compensation resistor 68, is placed in series with one arm of the Wheatstone bridge, preferably an arm having a standard strain gauge arm rather than a special resistance element at the structure. The second additional resistor, the bridge balancing resistor 70, is placed in series in another arm of the Wheatstone bridge, preferably an arm having a circuit resistance rather than a strain gauge. The temperature compensation resistor 60 is then selected to be of that value that will correct for all temperature-induced changes in the gauge output resistors, whether originating in the test structure, the gauge structure, the gauge filament, or the gauge leads. The bridge balancing resistor 70 is selected to compensate the temperature compensation resistor 68 such that the bridge is balanced at some ambient or reference temperature.

As another feature of applicant's invention, in cases where four active strain gauges cannot conveniently be used on the test body in order to provide the temperature compensation and monitoring effect discussed above, the error-producing effect of strain on the temperature measurement can be compensated out by coupling a feedback loop from the bridge output voltage back to the temperature monitoring galvanometer, as shown in FIGURE 7. Preferably, the isolating and impedance matching amplifier 80 would appear in the feedback loop to prevent any unwarranted effects from the galvanometer 50 upon the output voltage measuring equipment 52.

Thus, when strain measurements are being made by only a single active gauge and with the other three bridge resistors of the inactive or dummy gauge type, or with a half-bridge arrangement where overall resistance (such as $V_{40-42}$ is changed by any resistance changes in the single active gauge due to strain because no oppositely placed strain sensing elements are present to cancel out the overall resistance due to strain, feedback correction can work the cancellation necessary to a strain-pure temperature change indication at 50. One reason is that the current through the power supply 48 would otherwise be effected to a small degree by any strain being sensed by the system and thus some error would be introduced into the temperature measurement. Such error can, however, be cancelled out by the use of the computer 84 for feeding back a carefully controlled portion of the Wheatstone bridge output voltage $e$ through the isolating and impedance matching amplifier 80 into the temperature measuring circuit 50. In like manner, where the strain gauge system is not properly temperature compensated, a computer feedback loop from the temperature sensor 50 to the output voltage sensor 52 could correct any otherwise-uncompensated temperature-induced errors in the strain reading.

As a result of the provision of the above-described temperature compensated circuitry whereby temperature and strain can be measured simultaneously and without undue influence of one measurement upon the other, the invention makes possible a strain gauge system of the easily used "black box" variety, such as that shown in FIGURE 8, whereby an operator need only dial the type of metal being measured and a correction factor applicable to the strain gauges being used to derive on the readout device of the system a correct and error-free strain reading which by appropriate calibration may be made to indicate weight, distortion, force, pressure, or the like.

Although the invention has been described in its preferred form with a certain degree of particularity, it is understood that the present disclosure of the preferred form has been made only by way of example and that numerous changes in the details of construction and the combination and arrangements of parts may be resorted to without departing from the spirit and scope of the invention as hereinafter claimed. For example, the power supply 48 could easily be converted to a constant current source, so that a constant current would flow in the bridge between the terminal 40 and the terminal 42. As a result, a temperature sensor 50 would best be a voltmeter across the terminals 40, 42 rather than the series current sensor 50 discussed above; while strain indications could be transduced by monitoring current through the strain gauge or some other relevant leg of the Wheatstone bridge. Moreover, either a full bridge system with unbalanced bridge or a half bridge system leaving out the fixed resistors 64 and 66 could be used in place of the system of FIGURES 5-8.

I claim as my invention:

1. In combination for measuring the strain imposed upon a test structure and the temperature of the test structure:
   a strain gauge attached to the test structure and having a first resistance element responsive to changes in the stress imposed upon the test structure and to changes in the temperature of the test structure for providing changes in resistance value in accordance with such change in stress and temperature;
   at least a second resistance element disposed in contiguous relationship to the first resistance element and responsive only to changes in the temperature of the test structure, but not responsive to changes in the stress of the test structure, for providing changes in resistance value in accordance with such changes in temperature;
   regulated power means for providing a regulated supply voltage;
   means connecting the first and second resistance elements and the regulated power means in an electrical circuit to produce changes in current through the circuit in accordance with changes in the resistance of the first and second resistance elements resulting from changes in temperature of the stress member and to produce changes in voltage from the circuit in accordance with the changes in the resistance of at least the first resistance element resulting from changes in the stress of the stress member;
   resistance means connected in the electrical circuit with the first and second resistance elements and the regulated power means for compensating for any differences in the changes of resistance of the first and second resistance elements with changes in temperature;
   means operatively coupled to the electrical circuit for measuring the current through the circuit to provide an indication of the temperature of the test structure; and
   means operatively coupled to the electrical circuit for measuring the voltage from the electrical circuit to provide an indication of the stress imposed upon the test structure.

2. The combination set forth in claim 1 wherein the second resistance element is disposed to become stressed only in accordance with changes in the temperature of the test structure and not in accordance with changes in the stress of the test structure and wherein means are included in the electrical circuit with the first and second resistance elements and the regulated power means to compensate for any errors in the current through the current-measuring means as a result of the response of the first resistance element to changes in the stress and temperature of the first resistance element and the response of the second resistance element only to changes in the temperature of the test structure.

3. In combination for measuring the strain imposed upon a test structure and the temperature of the test structure:
   a strain gauge attached to the test structure to become stressed in accordance with changes in stress and the temperature of the test structure and having a first resistance member constructed to provide change in resistance value in accordance with changes in stress and disposed in the strain gauge to become stressed in accordance with the strain imposed upon the strain gauge;
   at least a second resistance member constructed to provide a change in resistance value in accordance with changes in stress and disposed in contiguous relationship to the first resistance member to provide changes in stress in accordance with change in the temperature of the test structure;
   a regulated power supply;
   a bridge circuit including first and second input terminals and first and second output terminals;
   means connecting the regulated power supply between the first and second input terminals of the bridge circuit;
   means connecting the first and second resistance members between the first and second input terminals of the bridge circuit to obtain changes in the flow of current through the bridge circuit in accordance with changes in the temperature of the test structure and to obtain changes in the voltage between the first and second output terminals of the bridge circuit in accordance with changes in the stress imposed upon the test structure;
   means connected to the bridge circuit for compensating for any differences between the variations of the resistance value of the first and second resistance members with changes in temperature;
   means connected to the bridge circuit for measuring the current flowing through the bridge circuit to provide an indication of the temperature of the test structure; and
   means connected between the first and second output terminals of the bridge circuit for measuroing the voltage between such terminals to provide an indication of the stress imposed upon such test structure.

4. The combination set forth in claim 3 wherein the first resistance member is constructed from a material having a composition of approximately 92% platinum and 8% tungsten to provide responses through an extended range of temperatures.

5. The combination set forth in claim 3 wherein the compensating means constitute resistance means.

6. The combination set forth in claim 5 wherein additional resistance means are connected in the bridge circuit and are adjustable to compensate for different values of the first and second resistance members.

7. In combination for measuring the strain imposed upon a test structure and the temperature of the test structure:
   a strain gauge attached to the test structure to become stressed in accordance with changes in stress and the temperature of the test structure and having a first resistance member constructed to provide change in resistance value in accordance with changes in stress and disposed in the strain gauge to become stressed in accordance with the strain imposed upon the strain gauge;
   at least a second resistance member constructed to provide a change in resistance value in accordance with changes in stress and disposed in contiguous relationship to the first resistance member to provide changes in stress in accordance with changes in the temperature of the test structure;
   a regulated power supply;
   a bridge circuit including first and second input terminals and first and second output terminals;
   means connecting the regulated power supply between the first and second input terminals of the bridge circuit;

means connecting the first and second resistance members between the first and second input terminals of the bridge circuit to obtain changes in the flow of current through the bridge circuit in accordance with changes in the temperature of the test structure and to obtain changes in the voltage between the first and second output terminals of the bridge circuit in accordance with changes in the stress imposed upon the test structure;

means connected to the bridge circuit for measuring the current flowing through the bridge circuit to provide an indication of the temperature of the test structure; and means connected between the first and second output terminals of the bridge circuit for measuring the voltage between such terminals to provide an indication of the stress imposed upon such test structure, the second resistance member responding only to changes in the temperature of the test structure and not to changes in the stress of the test structure and a temperature-compensating resistor connected with the first and second resistance members between the first and second input terminals of the bridge circuit and an additional compensating resistor connected in the bridge circuit to balance the effects in the bridge circuit of the temperature-compensating resistor.

8. The combination set forth in claim 7 where the temperature-compensating resistor and the additional compensating resistor are adjustable.

9. A method of measuring the stress imposed upon a test structure and the temperature of the test structure;

attaching to the test structure a strain gauge having a first resistance element responsive to changes in the stress imposed upon the test structure and to changes in the temperature of the test structure for providing change in the resistance value of the first resistance element in accordance with such changes in stress and temperature;

disposing in contiguous relationship to the first resistance element a second resistance element responsive to changes in the temperature of the test structure for providing changes in resistance value in accordance with such changes in temperature;

disposing the first and second resistance elements in an electrical circuit having characteristics of providing changes in current in accordance with changes in the temperature of the test structure and of providing changes in voltage in accordance with changes in the stress of the test structure;

measuring the changes in current in the electrical circuit to provide indications of the changes in the temperature of the test structure; and measuring the changes in voltage from the electrical circuit to provide indications of the changes in the stress imposed upon the test structure, the second resistance element being disposed relative to the test structure to be responsive only to changes in the temperature of the test structure and not to changes in the stress of the test structure.

10. A method of measuring the stress imposed upon a test structure and the temperature of the test structure;

attaching to the test structure a strain gauge having a first resistance element responsive to changes in the stress imposed upon the test structure and to changes in the temperature of the test structure for providing change in the resistance value of the first resistance element in accordance with such changes and stress and temperature;

disposing in contiguous relationship to the first resistance element a second resistance element responsive to changes in the temperature of the test structure for providing changes in resistance value in accordance with such changes in temperature;

disposing the first and second resistance elements in an electrical circuit having characteristics of providing changes in current in accordance with changes in the temperature of the test structure and of providing changes in voltage in accordance with changes in the stress of the test structure;

providing in the electrical circuit a temperature-compensating resistor having properties for compensating for differences in the variations in the resistance values of the first and second resistance elements with changes in temperature;

measuring the changes in current in the electrical circuit to provide indications of the changes in the temperature of the test structure; and measuring the changes in voltage from the electrical circuit to provide indications of the changes in the stress imposed upon the test structure.

References Cited

UNITED STATES PATENTS

| | | | |
|---|---|---|---|
| 2,322,319 | 6/1943 | Ruge | 73—88.5 XR |
| 2,826,062 | 3/1958 | Brown et al. | 73—88.5 XR |
| 2,948,872 | 8/1960 | Beckman | 73—88.5 XR |
| 3,034,347 | 5/1962 | Starr | 73—88.5 XR |
| 3,105,139 | 9/1963 | Russell | 338—2 |
| 3,237,138 | 2/1966 | Kooiman et al. | 338—4 |

CHARLES A. RUEHL, *Primary Examiner.*

U.S. Cl. X.R.

338—3